Nov. 17, 1959 R. V. MacALLISTER ET AL 2,912,855
FORCE-DEFORMATION MEASURING APPARATUS
Filed May 9, 1956 4 Sheets-Sheet 1

INVENTORS
ROBERT V. MacALLISTER
CARL J. REICHENWALLNER
BY Cameron, Kerkam & Sutton
ATTORNEYS Nov. 17, 1959

R. V. MacALLISTER ET AL 2,912,855

FORCE-DEFORMATION MEASURING APPARATUS

Filed May 9, 1956

INVENTORS
ROBERT V. MacALLISTER
CARL J. REICHENWALLNER

BY Cameron, Kerkam & Sutton

ATTORNEYS

Nov. 17, 1959  R. V. MacALLISTER ET AL  2,912,855
FORCE-DEFORMATION MEASURING APPARATUS
Filed May 9, 1956  4 Sheets-Sheet 3
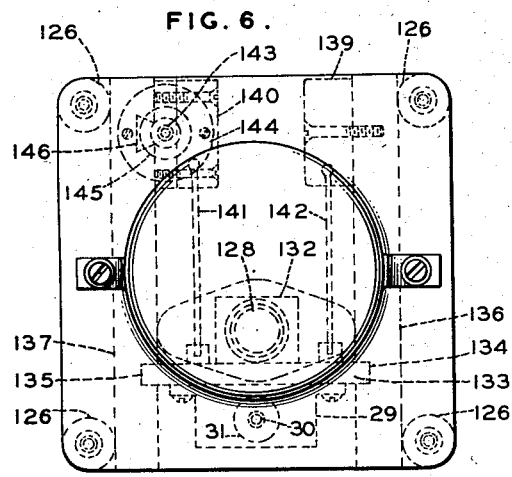
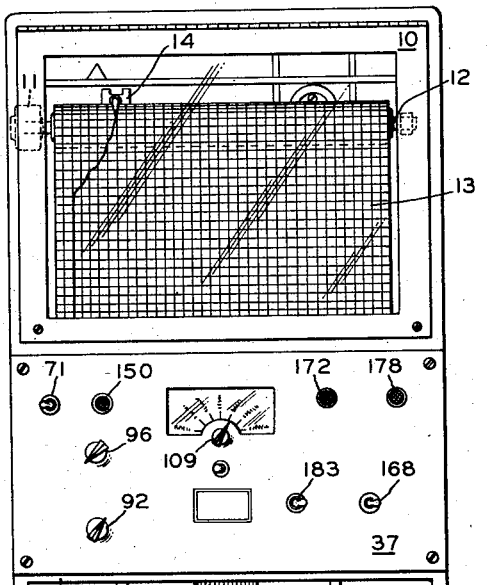
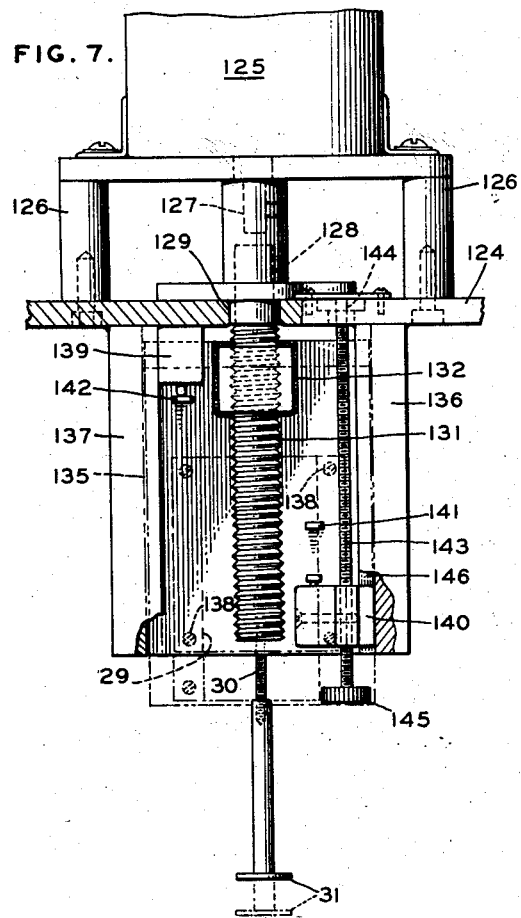
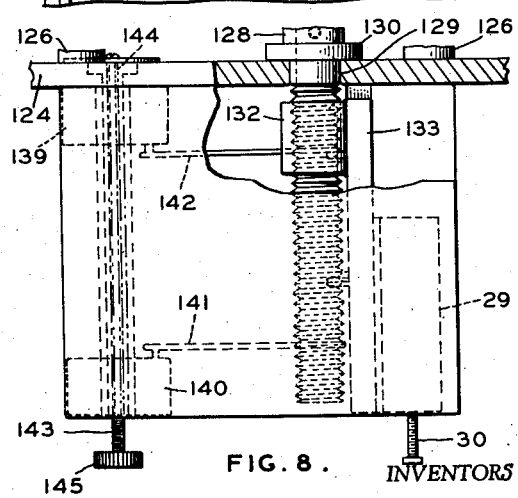
INVENTORS
ROBERT V. MacALLISTER
CARL J. REICHENWALLNER
BY
*Cameron, Kerkam & Sutton*
ATTORNEYS INVENTORS
ROBERT V. MacALLISTER
CARL J. REICHENWALLNER
BY Cameron, Kerkam & Sutton
ATTORNEYS United States Patent Office 2,912,855
Patented Nov. 17, 1959

2,912,855

FORCE-DEFORMATION MEASURING APPARATUS

Robert V. MacAllister, Denville, N.J., and Carl J. Reichenwallner, Glendale, N.Y., assignors to General Foods Corporation, New York, N.Y., a corporation of Delaware Application May 9, 1956, Serial No. 583,772

3 Claims. (Cl. 73—89)

This invention relates to force-deformation measuring apparatus and more particularly to such apparatus which provides precise and convenient determinations of important physical properties of materials by automatically recording the deformation of the material when subjected to externally applied forces. More particularly still this invention relates to such apparatus which measures force-deformation relationships which are directly related to the appearance and kinesthetic effect of foods as sensed subjectively by the consumer. Even more particularly, the present invention relates to such apparatus useful in the characterization of gels by the measurement of the force-deformation of the gels. Heretofore various force-deformation measuring devices have been suggested but these prior art devices have various disadvantages in their construction and use which the present invention overcomes. For example, in prior art devices the critical measurement of force is usually uncertain because of friction inherent in a mechanical system employing weights for measuring the amount of force while in the present invention measurement of force is essentially frictionless. Prior art devices usually give only one determination of the force exerted during the test while in the present invention a continuous measurement of the force exerted is recorded.

We have found that the difficulties inherent in prior art apparatus of this type may be overcome and additional advantages are obtained by utilizing the force exerted to cause deformation of the material to vary the resistances of a Wheatstone bridge which is normally balanced and to then employ the resulting potential across the Wheatstone bridge to actuate a recording potentiometer. The voltage reading of the recording potentiometer is proportional to the amount of force exerted on the material and the recording on the potentiometer is a direct graphical representation of the force-deformation characteristics of the material under test.

It is therefore an object of the present invention to provide novel force-deformation apparatus which provides precise and convenient determinations of physical properties of materials under test.

Another object is to provide such apparatus which automatically records in graphic form the deformation of a material when subjected to externally applied forces.

Another object is to provide such apparatus which automatically records force-deformation relationships of materials under test and, in the case of foods, provides objective evaluations of factors which are directly related to the appearance and kinesthetic effect of the food as sensed subjectively by the consumer.

Another object is to provide such apparatus in which a recording potentiometer provides a direct graphical representation of the force-deformation characteristics of the material under test.

Another object is to provide such apparatus in which the measurement of force is substantially free from friction.

Another object is to provide such apparatus in which the force exerted against the material is continuously measured during the test.

Another object is to provide such apparatus in which the force exerted on the material being tested is utilized to unbalance a Wheatstone bridge to cause a corresponding voltage to be recorded upon a recording potentiometer which electrical signal is proportional to the deformation of the material.

Other and further objects of the present invention will appear from the following description of illustrative embodiments thereof.

The novel force-deformation measuring apparatus of the present invention is capable of various mechanical embodiments certain of which are described hereinafter to illustrate the invention. These illustrative embodiments should in no way be construed as defining or limiting the invention and reference should be had to the appended claims to determine the scope of our inventive concept.

In the accompanying drawings in which like reference characters indicate like parts, Fig. 1 is a front view of an illustrative embodiment of the persent invention showing the arrangement of the component parts thereof in which the motor driving the recording potentiometer also drives the mechanism exerting force on the material being tested;

Fig. 5 is a front view of another illustrative embodiment of the apparatus of the present invention showing the the arrangement of the several parts thereof in which a pair of synchronous motors are employed, one to drive the potentiometer and the other to exert force upon the material being tested;

Fig. 6 is a view from above of the motor and mechanism for exerting force upon the material under test as employed in the embodiment of Fig. 5;

Fig. 7 is an enlarged view, partly in section, of a part of the embodiment of Fig. 5;

Fig. 8 is a side view of the enlarged detail of Fig. 7; and

Figure 1:
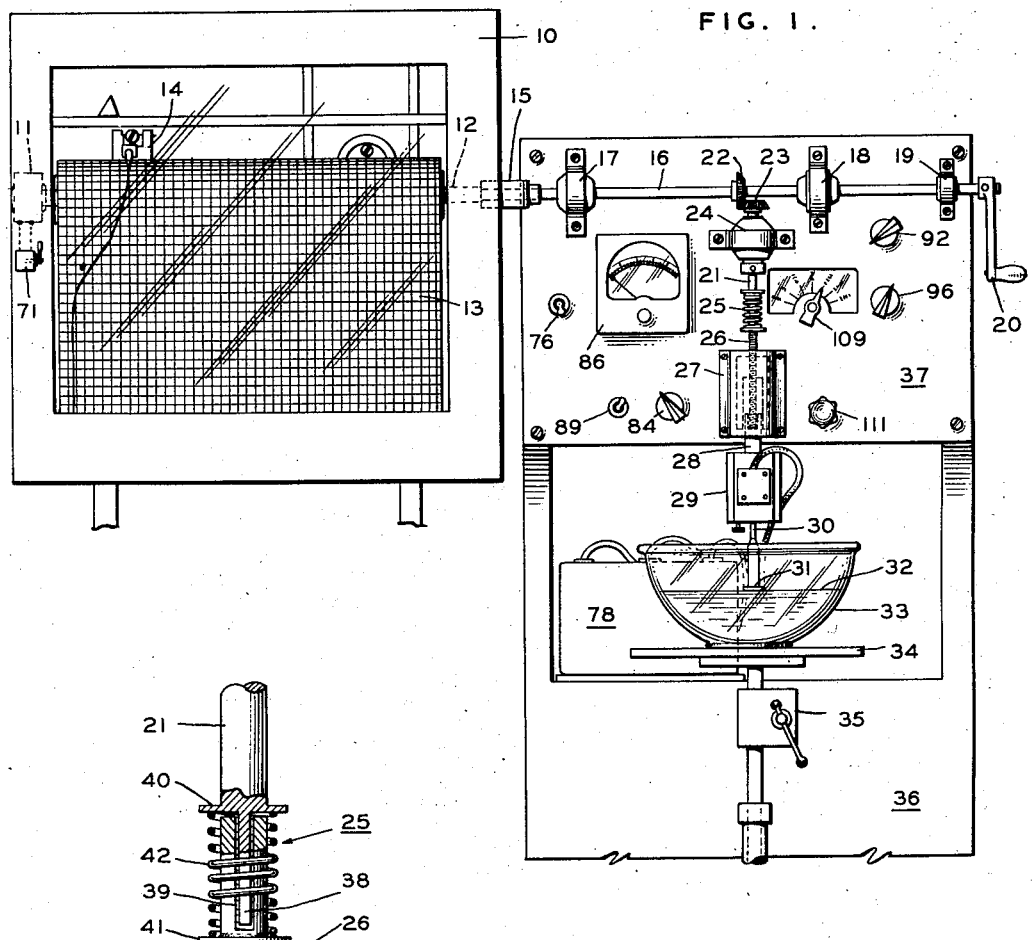

Referring now more particularly to the embodiment of the present invention shown in Figs. 1–4, 10 is any suitable recording potentiometer of known type in which a suitable electric motor 11 drives shaft 12 to move recording drum or graph 13 beneath pen 14, pen 14 being displaced, in known manner, across drum or graph 13 by drive means not shown which drive means are energized by an electric potential proportional to the forces exerted on the material under test, as will appear more fully hereinafter. Shaft 12 connects to manually operated clutch 15 which in turn is connected to shaft 16. Shaft 16 is mounted for rotation in suitable bearings 17, 18 and 19 and includes a crank 20 for manual actuation, when desired.

Shaft 16 is connected to vertical shaft 21 by gears 22 and 23, shaft 21 rotating in a suitable bearing 24. Shaft 21 connects through a suitable flexible coupling 25 to a second vertically disposed shaft 26. Shaft 26 drives through a suitable motion translating device generally indicated at 27 to impart vertical movement to shaft 28. Shaft 28 carries a suitable transducer 29 and transducer 29 supports rod 30 and disk 31 which apply force to the material under test which material is generally indicated at 32.

The material under test is contained in a suitable vessel 33 and vessel 33 is supported upon an adjustable platform 34. Vertical adjustment of platform 34 is obtained by use of a clamp 35 in obvious manner, clamp 35 being secured to the housing of the apparatus generally indicated at 36.

Housing 36 is provided with an instrument panel generally indicated at 37 upon which the switches and variable resistance controls are mounted as identified below in the discussion of Fig. 3. Instrument panel 37 also supports the several bearings referred to above.

Figure 2:
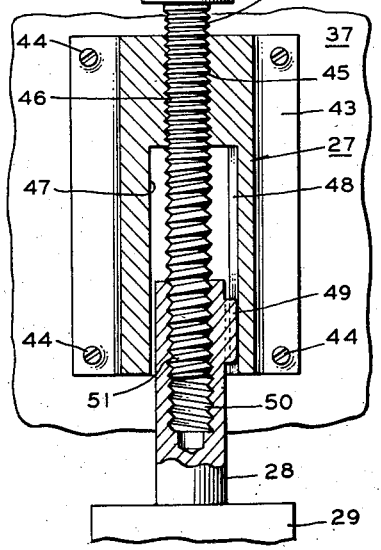
Fig. 2 is an enlarged detail of a part of the apparatus of Fig. 1 showing a portion of the mechanism for exerting force upon the material under test.

As referred to above, shaft 21 is connected to shaft 26 through a suitable extensible coupling generally indicated at 25. The detail of this coupling is shown in Fig. 2. Shaft 21 is provided with an axially extending tongue 38 which is mounted in a corresponding slot 39 in shaft 21 so that rotation of shaft 21 driving through tongue 38 also rotates shaft 26. Shaft 21 is provided with a collar 40 and a corresponding collar 41 is mounted on shaft 26. A suitable spring 42 is mounted between collars 40 and 41 and surrounds shaft 26 holding tongue 38 in slot 39. Spring 42 is a compression spring and urges collars 40 and 41 and their corresponding shafts away from each other.

Motion translating device 27 was referred to above and is shown in detail in Fig. 2. Device 27 includes a block 43 suitably secured to panel 37 by screws 44. Block 43 is axially bored and internally threaded at 45 to receive corresponding threads 46 formed on shaft 26. Block 43 is axially recessed at 47 to receive the upper end of shaft 28 and recess 47 is provided with a longitudinally extending slot 48. A key 49 is secured to shaft 28 and is mounted in slot 48 to prevent rotation of shaft 28. Shaft 28 is internally axially bored and threaded at 50 to receive corresponding threads 51 formed on the end of shaft 26, threads 51 being coarser than threads 46. Thus when shaft 21 is rotated shaft 26 is rotated and moves axially in block 43. Rotation and axial movement of shaft 26 imparts longitudinal axial nonrotary movement to shaft 28 which is proportionally greater than the movement of shaft 26 by reason of the difference between threads 51 and 46. Longitudinal movement is thereby imparted to transducer 29 and to rod 30 and disk 31 secured thereto to apply the desired force to the material 32 under test.

The transducer referred to above at 29 is shown somewhat schematically in Fig. 4 and the connection of its four strain sensitive resistance filaments as a Wheatstone bridge will be discussed hereinafter with respect to Fig. 3. Transducer 29 includes a frame 52 carried by shaft 28 and frame 52 encloses a generally rectangular opening 53. Tracks 54 and 55 are mounted in opening 53 and slide 56 is mounted for longitudinal movement within opening 53 on tracks 54 and 55. Rod 30 passes freely through frame 52 at 57 and is secured to the underside of block 56 at 58. Strain sensitive resistance filament 59 is secured to frame 52 at 60 and to slide 56 at 61. Strain sensitive resistance filament 62 is secured to frame 52 at 63 and to slide 56 at 64. Strain sensitive resistance filament 65 is secured to frame 52 at 66 and to slide 56 at 67. Strain sensitive resistance filament 68 is secured to frame 52 at 69 and to slide 56 at 70. The four strain sensitive resistance filaments 59, 62, 65 and 68 are mounted under initial tension and, when slide 56 is displaced longitudinally by a force exerted through rod 30 when shaft 28 moves frame 52, two of the filaments will shorten and two will elongate. The elongated filaments will increase in electrical resistance and the shortened filaments will decrease in electrical resistance. The change in resistance of the filaments is proportional to the force exerted through rod 30 and when transducer 29 is wired as a Wheatstone bridge, as in Fig. 3, the resistance change of the filaments alters the balance of the bridge and a voltage develops across the output leads of the bridge proportional to the force applied through rod 30.

Figure 3:
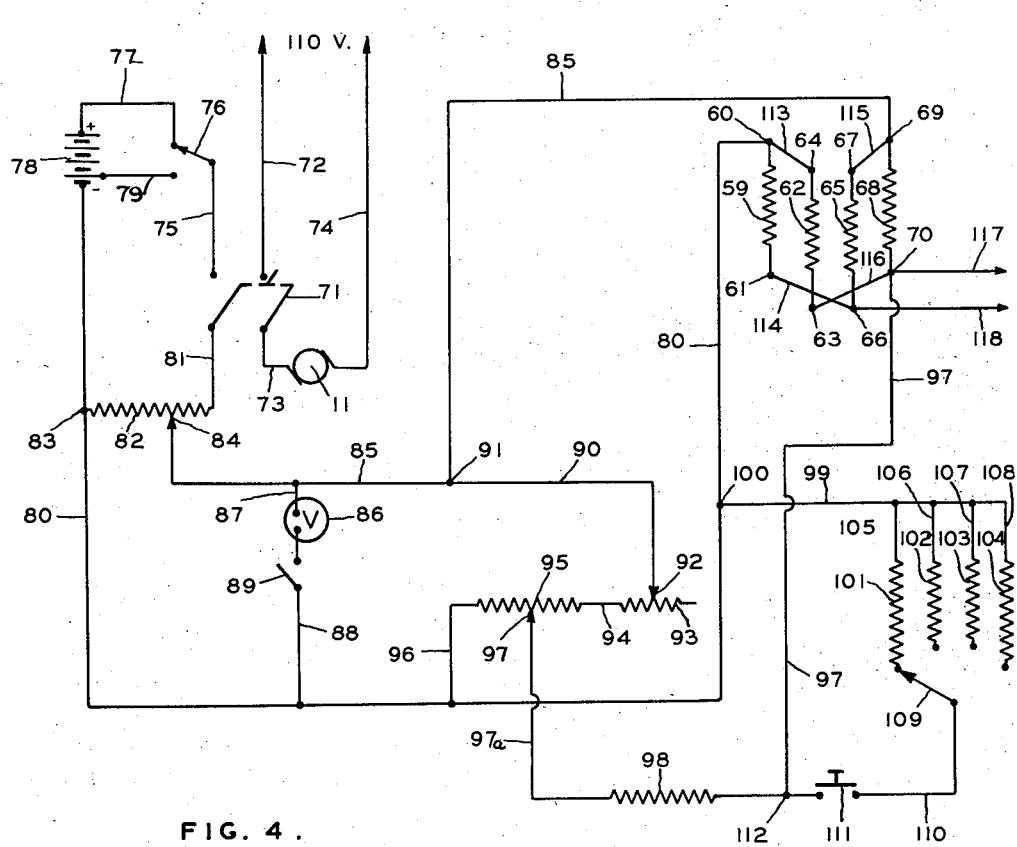
Fig. 3 is a circuit diagram of a suitable electric circuit for use with the embodiment of Fig. 1.
Figure 4:
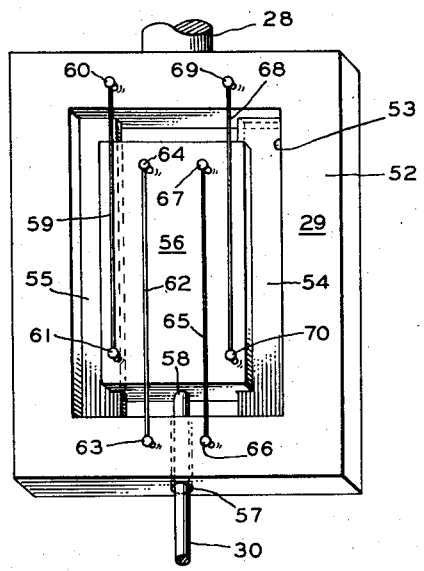
Fig. 4 is an enlarged detail of the transducer employed in the embodiment of Fig. 1.

A suitable circuit for use with the embodiment of Fig. 1 has been referred to as shown in Fig. 3. This circuit includes a double pole single throw switch 71, one side of which is connected by wire 72 to a suitable source of electrical power, preferably 110 volts, and the same side of switch 71 is connected by wire 73 to motor 11. The other side of motor 11 is connected by wire 74 to the aforesaid source of electrical energy. The second pole of switch 71 connects by wire 75 to switch 76 and one side of switch 76 is connected by wire 77 to battery 78. Wire 79 connects battery 78 to the second side of switch 76.

Battery 78 is connected by wire 80 to end 60 of strain sensitive resistance filament 59. The second pole of switch 71 is connected by wire 81 to variable resistance or helipot 82 which may have a value of 1000 ohms and resistance 82 connects at 83 to wire 80. When switch 71 is closed motor 11 is energized and at the same time battery 78 is connected across the Wheatstone bridge in transducer 29, since the variable contact 84 of helipot 82 is connected by wire 85 to end 69 of strain sensitive resistance filament 68. The voltage supplied by battery 78 can be either 2 volts or 8 volts depending upon the positon of switch 76. If switch 76 connects to wire 77 eight volts are supplied and if switch 76 connects to wire 79 two volts are supplied. The voltage applied to the bridge may be read upon voltmeter 86 which is connected across wires 80 and 85 by wires 87 and 88, respectively, a switch 89 being connected in series in wire 88.

Wire 90 is connected to wire 85 at 91 and connects to the variable contact 92 of variable resistance 93, variable resistance 93 having a total value of approximately 1000 ohms. Variable resistance 93 is connected by wire 94 to variable resistance 95 the other side of which is connected by wire 96 to wire 80. Variable resistance 95 may have a total value of 30,000 ohms and is provided with variable contact 97 which is connected through wire 97a and suitable resistance 98, of 18,000 ohms, to end 70 of strain sensitive resistance filament 68.

Wire 99 connects to wire 80 at 100 and resistances 101, 102, 103 and 104 are connected in parallel to wire 99 by wires 105, 106, 107 and 108, respectively. Resistances 101, 102, 103 and 104 may be of 115,000 ohms, 48,000 ohms, 25,000 ohms and 11,200 ohms, respectively. Rotary switch 109 contacts one of resistances 101, 102, 103 and 104, as may be desired, and is connected by wire 110 through switch 111 to wire 97 at 112.

As noted above, the four strain sensitive resistance filaments 59, 62, 65 and 68 are connected as a Wheatstone bridge and it has been pointed out that wire 80 connects to end 60 of resistance 59; that wire 85 connects to end 69 of resistance 68; and that wire 97 connects to end 70 of resistance 68. The Wheatstone bridge is completed by connecting ends 60 and 64 of resistances 59 and 62, respectively, by wire 113; by connecting ends 61 and 66 of resistances 59 and 65, respectively, by wire 114; by connecting ends 67 and 69 of resistances 65 and 68, respectively, by wire 115; and by connecting ends 63 and 70 of resistances 62 and 68, respectively, by wire 116. Voltages across this Wheatstone bridge by reason of any unbalance thereof are led to the drive means for pen 14 by wires 117 and 118, wire 117 connecting to end 70 of resistance 68 and wire 118 connecting to end 66 of resistance 65.

With the embodiment of the present invention of Figs. 1–4 arranged as above described and when it is desired to use the apparatus it is necessary to select an appropriate range of resistance in ohms for any given material to be tested. If the strain deformation characteristics of a starch pudding is to be measured a resistance range of approximately 11,000 ohms is suitable while a gelatin dessert requires a range of resistance of 48,000 to 115,000 ohms. For a given material to be tested the appropriate range of resistance is had by moving switch 109 to engage the appropriate resistances 101, 102, 103 or 104 and switch 111 is closed. Variable resistance 82 is then adjusted to correspond with the range of resistance established by the position of switch 109 and switch 111 is then opened. The Wheatstone bridge of transducer 29 is then balanced by adjusting variable resistances 93 and 95, resistance 95 being a coarse adjustment and resistance 93 providing a fine adjustment.

With the circuit of Fig. 3 adjusted for the material to be tested, as described above, and with switch 71 closed and switch 76 supplying suitable voltage to the circuit from battery 78, motor 11 is energized and rotates shaft 12 moving chart 13 under pen 14 and at the same time rotating shaft 16 through clutch 15. Rotation of shaft 16 rotates shaft 21 through gears 22 and 23 and rotation of shaft 21 driving through flexible and extensible coupling 25 rotates shaft 26. Rotation of shaft 26 moves shaft 26 longitudinally in block 43 and moves shaft 28 axially without rotation because of the engagement of key 49 and slot 48. Axial movement of shaft 28 moves transducer 29, rod 30 and disk 31 axially with respect to the material 32 being tested. Pressures exerted by material 32 on disk 31 and rod 30 causes rod 30 to move slide 56 within transducer 29 and to vary the resistances 59, 62, 65 and 68 constituting the Wheatstone bridge which had previously been in balance. Unbalance of this Wheatstone bridge causes a proportional voltage across wires 117 and 118 which is transmitted to the driving means for pen 14 moving pen 14 correspondingly across graph 13 to trace a curve which provides a continuous force-deformation measurement for the material 32 being tested.

Another illustrative embodiment of the present invention is shown in Figs. 5–9 in which embodiment two synchronous electric motors are employed, one driving the chart or graph 13 of the recording potentiometer 10 and the other driving the transistor 29 and its associated rod 30 and disk 31. In this embodiment of the present invention the action of the motor driving the transducer is automatically reversed at the end of the downward movement and is automatically stopped at the end of the upward movement of the transducer. The characteristics of the material under test are continuously recorded during both the downward and upward movement of the disk 31. Suitable structure for accomplishing these results is shown in Figs. 5–8 and Fig. 9 is a circuit diagram of a suitable electric circuit for energizing the synchronous motors of this invention and for transmitting electrical energy to the drive means of the pen 14 proportional to the force-deformation characteristics of the material being tested.

Referring now to Figs. 5–8 it will be seen that the recording potentiometer 10 is mounted upon housing 36 above panel 37; that the graph 13 thereof is driven by motor 11; and that pen 14 traces a curve across the graph 13. Container 33 for the material 32 under test is mounted upon a suitable platform 119 which is of adjustable height being carried in notches 120 and 121 in uprights 122 and 123, respectively. Housing 36 is provided with a horizontal member 124 and motor 125 for applying motion to transducer 29 is mounted upon member 124 being spaced therefrom by suitable legs 126. Motor 125 is provided with a downwardly extending armature shaft 127 to which is suitably secured a drive shaft 128, drive shaft 128 passing through opening 129 in member 124. A bearing collar 130 is carried by shaft 128 and engages the upper surface of member 124.

The lower end of shaft 128 is threaded at 131 and a suitable traveling nut 132 is mounted upon threads 131. Nut 132 is suitably secured to plate 133 and plate 133 is mounted for vertical movement in slots 134 and 135 of frame members 136 and 137, respectively. Frame members 136 and 137 are supported beneath member 124. Transducer 29 is suitably secured to the lower face of plate 133 as by screws 138.

Upper limit switch 139 is carried by frame member 137 adjacent member 124 and lower limit switch 140 is adjustably mounted, as will be more fully described hereinafter, at the lower end of frame member 136. Plate 133 carries finger 141 for engagement with and actuation of lower limit switch 140 and carries a second finger 142 for engagement with an actuation of upper limit switch 139.

Lower limit switch 140 is adjusted by means of threaded screw 143 which rotates in a suitable bearing 144 in member 124 and passes through and engages suitable corresponding threads in switch 140. Screw 143 is provided with a suitable knurled knob 145 for manual rotation. Frame member 136 is provided with a vertically extending slot 146 in which switch 140 is mounted for vertical movement. Rotation of knurled knob 145 in suitable direction acting through threaded screw 143 moves limit switch 140 in slot 146 and adjusts its position and the amount of downward movement of transducer 29 and disk 31.

Figure 9:
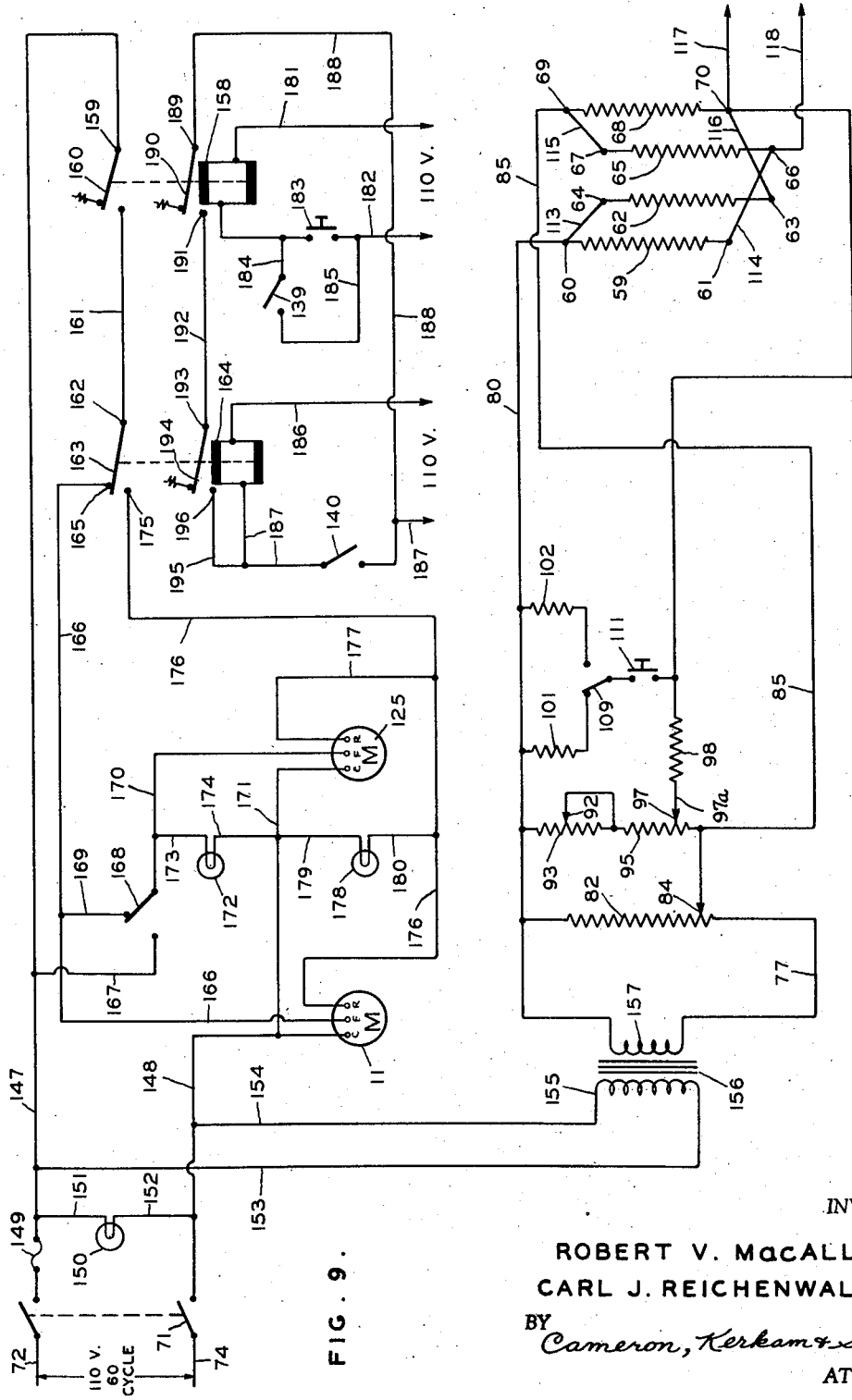
Fig. 9 is a circuit diagram of a suitable electrical circuit for use with the embodiment of Fig. 5.

The circuit diagram of Fig. 9 shows a suitable electric circuit for use with the structure described above within Figs. 5–8. In this circuit wires 72 and 74 lead from a suitable source of electrical energy, preferably 110 volts, 60 cycle, and connect to switch 71 which, as before, is a double pole single throw switch. One side of switch 71 connects wire 72 to wire 147 and the other side of switch 71 connects wire 74 to wire 148. A suitable fuse 149 may be connected in series in wire 147 and a red pilot light 150 may be connected across wires 147 and 148 by wires 151 and 152 to indicate when the circuit is energized. Wire 153 connects to wire 147 and wire 154 connects to wire 148, wires 153 and 154 connecting to the primary windings 155 of a suitable step-down transformer 156 which takes the place of battery 78 in the circuit of Fig. 3. The secondary windings 157 of transformer 156 is connected to wires 77 and 80 of the Wheatstone bridge circuit which is similar to that of Fig. 3. In the Wheatstone bridge circuit of Fig. 9 only two resistances 101 and 102 are shown but it is to be expressly understood that additional resistances can be utilized here for suitable range adjustment as described with respect to Fig. 3. The Wheatstone bridge circuit of Fig. 9 is somewhat simplified as compared to that of Fig. 3 but the functions of the several variable resistances are the same as the corresponding resistances in Fig. 3. The Wheatstone bridge circuit of Fig. 9 will therefore be readily understood from its similarity to that of Fig. 3 and will not be further described.

Wire 147 connects to one side of a double pole single throw solenoid actuated switch 158 at 159 and when switch arm 160 is closed connects to wire 161 which in turn connects at 162 to arm 163 of two pole double throw solenoid actuated switch 164. Arm 163 normally connects at 165 to wire 166 which in turn connects to the forward drive connection of reversible motor 11, wire 148 connecting to the return connection of motor 11. Wire 167 connects to wire 147 and to one side of a single pole double throw switch 168. The other side of switch 168 connects by wire 169 to wire 166. Switch 168 is connected by wire 170 to the forward drive connection of reversible motor 125 and the return connection of motor 125 is connected by wire 171 to return wire 148. A suitable green pilot light 172 may be connected by wires 173 and 174 across wires 170 and 171 to show forward drive of the motors.

Arm 163 of solenoid actuated switch 164 in lower position engages contact 175 of wire 176 and wire 176 connects to the reverse drive connection of motor 11 and connects to the reverse drive connection motor 125 through wire 177. A suitable amber colored pilot light 178 may be connected by wires 179 and 180 across wires 171 and 176 to indicate when the motors are in reverse drive.

The solenoid of solenoid actuated switch 158 is energized by wires 181 and 182 connected thereto and leading to a suitable source of electrical energy. Push button switch 183 is connected in series in wire 182 and upper limit switch 139 is connected across switch 183 by wires 184 and 185.

The solenoid of solenoid actuated switch 164 is energized by wires 186 and 187 connected thereto which lead to any suitable source of electrical energy, wire 187 having lower limit switch 140 connected in series therein. Wire 187 is connected by wire 188 at 189 to the second switch arm 190 of solenoid actuated switch 158 and arm 190 connects at contact 191 to wire 192. Wire 192 connects at 193 to the second switch arm 194 of solenoid actuated switch 164. Arm 194 connects to wire 195 at contact 196 and wire 195 connects to wire 187.

With the embodiment of Figs. 5–9 arranged as above described and assuming that transducer 29 is in its raised position with arm 142 opening limit switch 139, when it is desired to determine the force-deformation characteristics of a sample 32 suitably arranged beneath disk 31, switch 71 is closed to energize the circuit of Fig. 9. Red pilot light 150 then shows to indicate the energization of the circuit but motors 11 and 125 are not energized because solenoid actuated switch 158 is open. Push button switch 183 is then closed temporarily and solenoid actuated switch 158 is energized drawing arms 160 and 190 downwardly. Arm 160 establishes the circuit from wire 147 through wire 161, switch 163, wires 166 and 169, switch 168, and wire 170 to motor 125 and the circuit for motor 125 is completed through wire 171 and wire 148 to wire 74. At the same time the circuit to motor 11 is completed through wire 166 and wire 148 to wire 74 and motors 11 and 125 are energized to move graph 13 and to start the travel of transducer 29 downwardly. Downward movement of transducer 29 moves arm 142 away from limit switch 139 and closes the circuit around switch 183 to keep solenoid actuated switch 158 energized when switch 183 is released.

Motion downwardly of transducer 29 brings disk 31 into engagement with sample 32 and the resistance of sample 32 to deformation causes an unbalance of the Wheatstone bridge formed by resistances 59, 62, 65 and 68 supplying a potential to wires 117 and 118 which when transmitted to the drive for pen 14 causes the tracing of a curve upon the moving graph 13.

When transducer 29 has traveled downwardly to the point where arm 141 closes limit switch 140 the solenoid of solenoid actuated switch 164 is energized and moves switch arms 163 and 194 downwardly into contact with points 175 and 196, respectively. Motors 11 and 125 are then reversed, the circuit to motor 125 being established from wire 161 through wires 176 and 177 to motor 125 and from motor 125 through wires 171 and 148 to wire 74. At the same time the reverse drive circuit of motor 11 is established through wire 176 and from motor 11 through wire 148 to wire 74. The transducer 29 is then moved upward and the direction of movement of graph 13 is reversed. Upward movement of transducer 29 draws disk 31 upward and the pressures exerted on disk 31 cause unbalance of the Wheatstone bridge and move pen 14 in the manner above described. Upon reversal of motor 125, arm 141 breaks contact with limit switch 140 to allow limit switch 140 to open but the solenoid of solenoid actuated switch 164 remains energized through the circuit established by wire 188, switch arm 190, wire 192, switch arm 194, wire 195, wire 187, and wire 186.

Motors 11 and 125 continue drive in reverse direction until arm 142 engages upper limit switch 139, which had closed on the downward movement of transducer 29, and limit switch 139 is opened breaking the circuit energizing the coil of solenoid actuated switch 158. Since push button switch 183 is open, the coil of solenoid actuated switch 158 is deenergized and switch arms 160 and 190 move to their upward position breaking the circuits to motors 11 and 125 and the motors are deenergized.

It should now be apparent to those skilled in the art that the present invention provides novel force-deformation measuring apparatus which in every way satisfies the several objectives described above.

Changes in or modifications to the above described illustrative embodiments of this invention may now be suggested to those skilled in the art without departing from the present inventive concept. Reference should therefore be had to the appended claims to determine the scope of this invention.

What is claimed is:

1. In force-deformation measuring apparatus, a recording potentiometer, a pair of synchronous reversible electric motors one of said motors driving said recording potentiometer, a transducer mounted for reciprocal movement and including a normally balanced Wheatstone bridge, means for reciprocating said transducer powered by the other of said electric motors, pressure applying means carried by said transducer for applying pressure to the material under test upon movement of said transducer, means connected to said pressure applying means for varying the resistance of said Wheatstone bridge, means for applying a voltage to said normally balanced Wheatstone bridge, circuit means connected across said Wheatstone bridge and to said recording potentiometer, and electric circuits for energizing said motors, whereby variations in the unbalance of said Wheatstone bridge caused by the resistance of the material under test to said pressure applying means supply a proportional voltage to said recording potentiometer whereby there will be directly recorded on said potentiometer a plot of the force applied to said pressure applying means as a function of the displacement thereof.

2. Force-deformation measuring apparatus as described in claim 1 in which said means for moving said transducer include a reciprocal plate, means for securing said transducer to said plate, an internally threaded member carried by said plate, a threaded rotatable shaft mounted in said member and means for connecting said threaded shaft for rotation to the second of said motors.

3. In force-deformation measuring apparatus, a recording potentiometer, a pair of synchronous reversible electric motors one of said motors driving said recording potentiometer, a transducer mounted for reciprocal movement and including a normally balanced Wheatstone bridge, means actuated by the other of said motors for moving said transducer, pressure applying means carried by said transducer for applying pressure to the material under test upon movement of said transducer, means connected to said pressure applying means for varying the resistance of said Wheatstone bridge, means for supplying a voltage to said normally balanced Wheatstone bridge circuit, circuit means connected across said Wheatstone bridge and connected to said recording potentiometer, electric circuits for energizing said motors for rotation in one direction, electric circuits for energizing said motors for rotation in the reverse direction, a lower limit switch in the first of said electric circuits actuated by predetermined downward movement of said transducer to open said electric circuits and to close said electric circuits for reverse rotation of said motors, and an upper limit switch in said second electric circuits opened by predetermined upward movement of said transducer to open all of said electric circuits.

References Cited in the file of this patent
UNITED STATES PATENTS

| | | |
|---|---|---|
| 1,540,979 | Bloom | June 9, 1925 |
| 2,175,173 | Batchelder | Oct. 10, 1939 |
| 2,520,923 | Franzel | Sept. 5, 1950 |
| 2,573,286 | Statham | Oct. 30, 1951 |
| 2,638,779 | Wilson | May 19, 1953 |
| 2,669,867 | Holmes | Feb. 23, 1954 |
| 2,677,271 | Faris | May 4, 1954 |